United States Patent
Villafranca Díaz et al.

(10) Patent No.: US 12,409,924 B2
(45) Date of Patent: Sep. 9, 2025

(54) PRESSURE BULKHEAD ATTACHMENT

(71) Applicant: AIRBUS OPERATIONS, S.L.U., Madrid (ES)

(72) Inventors: Israel Villafranca Díaz, Madrid (ES); Rafael De La Torre San José, Madrid (ES)

(73) Assignee: AIRBUS OPERATIONS, S.L.U., Madrid (ES)

(*) Notice: Subject to any disclaimer, the term of this patent is extended or adjusted under 35 U.S.C. 154(b) by 146 days.

(21) Appl. No.: 18/351,865

(22) Filed: Jul. 13, 2023

(65) Prior Publication Data
US 2024/0017813 A1     Jan. 18, 2024

(30) Foreign Application Priority Data
Jul. 13, 2022 (EP) .................................... 22382663

(51) Int. Cl.
*B64C 1/10* (2006.01)

(52) U.S. Cl.
CPC ..................................... *B64C 1/10* (2013.01)

(58) Field of Classification Search
CPC .... B63B 3/14; B63B 3/26; B63B 3/34; B64C 1/06; B64C 1/064; B64C 1/068; B64C 1/0685; B64C 1/10; B64C 1/12; B64C 5/02; B64C 2001/0081; B64C 2001/009; B64F 5/10
USPC ......................................................... 244/119
See application file for complete search history.

(56) References Cited

U.S. PATENT DOCUMENTS

| | | | |
|---|---|---|---|
| 6,378,805 B1 * | 4/2002 | Stephan ................ | B64C 1/10 244/119 |
| 10,689,088 B2 * | 6/2020 | Orlov ................... | B64C 1/10 |
| 10,822,070 B2 * | 11/2020 | Grase ................... | B64C 1/10 |
| 10,926,857 B2 * | 2/2021 | McNamara ........... | B64C 1/069 |
| 2010/0243806 A1 * | 9/2010 | Vera Villares ........ | B64C 1/10 244/119 |

(Continued)

FOREIGN PATENT DOCUMENTS

| | | |
|---|---|---|
| EP | 2415661 A1 | 2/2012 |
| EP | 3771635 A1 | 2/2021 |

(Continued)

OTHER PUBLICATIONS

Extended European Search Report for EP Application No. 22382663.7 dated Dec. 19, 2022, 5 pages.

*Primary Examiner* — Joshua E Rodden
(74) *Attorney, Agent, or Firm* — Nixon & Vanderhye P.C.

(57) ABSTRACT

A section of fuselage for an aircraft including: a pressure bulkhead having a dome-shaped structure and at least one coupling structure extending from the edge of the dome-shaped structure, and at least one circumferential structure arranged on a skin of the section of fuselage, wherein the dome-shaped structure is secured to the circumferential structure via a distal portion of the coupling structure, wherein said distal portion is coupled to a foot portion of the circumferential structure, the coupling structure extending obliquely from the foot portion of the circumferential structure, such that the distance between a skin of the section of fuselage and the coupling structure increases from the foot portion to the edge of the dome-shaped structure.

16 Claims, 5 Drawing Sheets

(56) References Cited

U.S. PATENT DOCUMENTS

| 2011/0233334 | A1* | 9/2011 | Stephan | B64C 1/10 |
| | | | | 244/119 |
| 2012/0186062 | A1* | 7/2012 | Vera Villares | B64C 1/069 |
| | | | | 29/428 |
| 2012/0228427 | A1 | 9/2012 | Sayilgan et al. | |
| 2019/0039711 | A1* | 2/2019 | Diep | B64C 1/10 |

FOREIGN PATENT DOCUMENTS

| RU | 2472671 C1 * | 1/2013 | B64C 1/10 |
| WO | WO-2010003818 A2 * | 1/2010 | B21J 15/14 |

* cited by examiner

PRESSURE BULKHEAD ATTACHMENT

RELATED APPLICATION

This application incorporates by reference and claims priority to European Patent Application EP22382663.7, filed Jul. 13, 2022.

TECHNICAL FIELD

The present invention belongs to the field of aircraft parts, and particularly, relates to the configuration and arrangement of rear pressure bulkheads (RPB).

Specifically, the invention is encompassed within the development programs of aircraft wherein a pressurized space, such as the cabin, is extended by enlarging the size of the fuselage. The present invention provides a structural modification of the rear pressure bulkhead to gain additional pressurized space without enlarging the size of the aircraft fuselage while minimizing the auxiliary elements, such as fittings and stringers, required to attach the pressure bulkhead to a circumferential structural element of the aircraft.

BACKGROUND

Normally, in the commercial air transport industry, the internal volume defined by the aircraft fuselage is divided into a pressurized zone and a non-pressurized zone, where the separation of the zones is delimited by a rear pressure bulkhead. The bulking typically consists of a substantially circular composite part, either flat or slightly curved, attached to a circumferential frame of the fuselage.

On the one hand, the pressurized space is designed to transport passengers, in conditions suitable for their comfort and habitability. The non-pressurized space, such as at the rear part of the aircraft, is intended to house aircraft systems, such as an APU (Auxiliar Power Unit) and a THSA (Trimmable Horizontal Stabiliser Actuator).

In view of the above, the rear pressure bulkhead, interposed between said pressurized and non-pressurized zones, should ensure a correct air-tightness during all flight phases withstanding the varying pressure differences which may reach up to about 1300 hPa.

To better integrate this structural element in the overall fuselage manufacturing, the aircraft fuselage is typically manufactured in different parts that are assembled together at a later stage forming two main fuselage sections. The sections are a forward fuselage, which is a space intended to be pressurized at high altitude, and a non-pressurized rear fuselage. These sections are connected by an orbital fuselage joint (also known as 'Buttstrap joint' or just 'Strap joint').

Traditional solutions of rear pressure bulkheads are arranged at the orbital fuselage joint connection, that is, in the forward fuselage, particularly attached to the last frame thereof.

Due to its high safety requirements and great impact in structural design, the rear pressure bulkhead is addressed at the early stages of any aircraft design process, thus making it extremely difficult to plan and carry out any future structural change thereof.

Accordingly, any attempt to increase the pressurized cabin, in order to gain additional cabin space, was dealt with simply by enlarging the forward fuselage, that is, without modifying the original design of the pressure bulkhead in terms of fuselage integration.

Nowadays, current solutions have been developed for modifying the integration design of rear pressure bulkheads to allow increasing pressurized cabin space without modifying the overall length of the aircraft.

These solutions involve moving the pressure bulkhead to a delayed position with respect to the frame to which they were connected, through the implementation of several mechanical connection elements that allow the bulkhead to be fixed, providing stability and resistance to the connection, while allowing the transmission of loads to said frame.

In particular, current installations are composed by numerous parts, such as shearwebs, T-fittings, 'V' or 'Y' chords, for attaching the RPB, by means of riveted connections, to the skin, to the Buttstrap joint and to the nearest frame.

SUMMARY

The present invention provides a section of fuselage for an aircraft comprising: a pressure bulkhead comprising a dome-shaped structure and at least one coupling structure extending from the edge of the dome-shaped structure, and at least one circumferential structure arranged on skin of the section of fuselage, wherein the dome-shaped structure is secured to the circumferential structure via a distal portion of the coupling structure, and wherein said distal portion is coupled to a foot portion of the circumferential structure, the coupling structure extending obliquely from the foot portion of the circumferential structure, such that the distance between a skin of the section of fuselage and the coupling structure increases from the foot portion to the edge of the dome-shaped structure.

Through this entire document, when referring to a 'circumferential structure' (such as a frame or a strap joint), it will be understood as a structure whose contour or edge corresponds substantially with the periphery of the cross section of the fuselage where the circumferential structure is mounted in. Therefore, as most of commercial aircraft have a substantially circular fuselage, it is provided with a substantially circular structure.

It is to be noted that circumferential structures (frames and strap joints), along with longitudinal structures such as longerons and beams, jointly form the primary structure of a section of fuselage for an aircraft, this providing aeroshape to the outer skin to which they are joined.

The portions of the circumferential frame may be either metallic (such as aluminium or titanium) or made of composite such as Carbon Fiber Reinforced Plastic, 'CFRP'.

The 'dome-shaped structure' is the main structure separating the internal volume defined by the section of fuselage for an aircraft into the pressurized zone (i.e. the cabin where passengers are carried) and the non-pressurized zone, where multiple aircraft systems such as an APU are installed.

In particular, in use, the concave surface of the dome-shaped structure is oriented towards the pressurized area while the convex surface is oriented towards the non-pressurized area. By this way, the pressurized air exerts pressure homogeneously over the entire concave surface.

More in particular, according to vessel stress distribution, the pressure bulkhead withstands static pressure from pressurized air (i.e. radial stresses normal to the pressure bulkhead surface) and redistributes it in the form of tangential stresses. Then, these tangential stresses are transferred from the pressure bulkhead to the circumferential structure to which it is attached via the coupling structure. The more uniform the stress distribution is (for instance, by a quasi-circular frame), the better the load transferring may be.

Accordingly, the inherent geometrical structure of the pressure bulkhead (i.e., the dome-shaped structure) and the coupling structures provide a suitable load distribution which does not jeopardize the structural integrity of the assembly.

In particular, according to the present invention at least one coupling structure extends from the edge of the dome-shaped structure obliquely towards a foot portion of the circumferential structure, to which said coupling structure is connected through its distal portion.

It shall be understood that a 'foot portion' of a circumferential structure is a portion thereof which is fastened directly to the skin (or, at least, the portion of the structure closest to the skin) of the section of fuselage of the aircraft.

As to the term oblique, it shall be understood that the coupling structure extends from the edge of the dome-shaped structure at a certain angle with respect to the skin of the fuselage section, so as to approach progressively, that is, gradually at a lesser distance with respect to said skin, up to the point of contact with the foot portion to which it is connected by means of its distal portion.

By virtue of the detailed configuration of the attachment of the dome-shaped structure to the circumferential structure by means of at least one coupling structure, said coupling structure primarily works in tension, withstanding traction forces. On the contrary, the shear webs of the prior art, which are attached along their longitudinal length to the skin by means of a riveted joint, distribute the loads induced from the dome-shaped structure as shear stresses.

The present invention provides a solution for displacing the pressure bulkhead, by virtue of the coupling structure, with respect to the circumferential structure to which it would otherwise be connected through direct mechanical contact.

Additionally, said distance displaced is gained as additional pressurized area without enlarging the forward fuselage.

However, unlike the prior art solutions, where a connection between the pressure bulkhead and the circumferential structure was established by means of numerous parts, such as shear webs, L fittings or T-fittings attached by means of riveted connections to the pressure bulkhead, the skin of the fuselage, and the circumferential structure, the present invention provides a connection which allows displacing the traditional location of the pressure bulkhead using just at least one coupling structure, that is, eliminating the need of having said multiple parts and rivets that increase significantly the cost in addition to the weight and the assembly time of this section.

Accordingly, a main advantageous effect of the present invention is to decrease the number of parts and rivets used and, consequently, reduce the weight, time and the costs associated to the manufacturing and maintenance with respect to the known solutions.

In an embodiment, at least one coupling structure is a built-in extension of the dome-shaped structure.

Such a 'built-in' extension shall be understood as a portion of the pressure bulkhead manufactured integrally (for example, by additive manufacturing) with the dome-shaped structure.

In other words, it shall be regarded as an additional length projecting outwards from the edge of the dome-shaped structure, thus providing structural continuity. Geometrically, in cross-section, such 'built-in' extension extends tangentially from the edge of the dome-shaped structure.

The built-in extension may define a geometric continuity with the rest of the dome-shaped structure through the edge from which it projects. That is, the built-in extension does not deviate in an abrupt manner from the dome-curvature in cross-section but keeps the same curvature as the dome-shaped structure.

Regarding such structural continuity, in one embodiment, the thickness of the pressure bulkhead is constant and coincides with the thickness of the built-in extension.

In one embodiment, the geometry of the built-in extension is substantially trapezoidal, having a greater width at the geometric junction interface with the edge of the dome-shaped structure, and a progressively smaller width from said edge to the distal portion connected to the circumferential structure.

In an embodiment, at least one coupling structure is a plate-shaped fitting coupled by a proximal portion to the edge of the dome-shaped structure.

Such a 'plate-shaped' fitting shall be understood as a structure in which the dimensions in two directions predominate over the other. In this sense, width shall be understood as the dimension defining the distance between lateral ends occupying a portion of the edge of the dome-shaped structure; length shall be understood as the dimension of the distance between said edge of the dome-shaped structure and the distal portion of the coupling structure; and finally thickness shall be understood as the distance between the surface facing the concave side and the convex side of the pressure bulkhead. In this sense, the thickness will be the smallest dimension of the plate-shaped fitting.

Alike the built-in extension, the plate-shaped fitting shall be regarded as an additional length projecting outwards from the edge of the dome-shaped structure in order to couple said dome-shaped structure to the section of fuselage of the aircraft. Geometrically, in cross-section, such plate-shaped fitting extends tangentially from the edge of the dome-shaped structure.

The plate-shaped fitting extension may provide structural continuity with the rest of the dome-shaped structure through the edge from which it projects. That is, the plate-shaped fitting does not deviate in an abrupt manner from the dome-curvature through the connection interface between them through the proximal portion of the plate-shaped fitting in cross-section, but keeps the same curvature as the dome-shaped structure.

Regarding such structural continuity, in one embodiment, the thickness of the pressure bulkhead is constant and coincides with the thickness of the plate-shaped fitting.

In an embodiment, the geometry of the plate-shaped fitting is substantially trapezoidal, having a greater width at the connection interface between the proximal portion and the edge of the dome-shaped structure, and a progressively smaller width from said edge to the distal portion connected to the circumferential structure. In other embodiments, the geometry of the plate-shaped fitting is substantially rectangular, having a substantially constant width from the proximal to the distal portion. In other embodiments, the plate-shaped fitting has a variable width.

In an embodiment, the coupling structure is in the form of a curved plate.

In an embodiment, the plate-shaped fitting is fastened to the edge of the dome-shaped structure by means of a riveted joint.

In an embodiment, the coupling structure is coupled to the circumferential structure by means of a riveted joint.

In an embodiment, the foot portion of the circumferential structure is plate-shaped, and the distal portion of the coupling structure comprises a substantially flat portion contacting along its surface a respective surface of the plate-shaped foot portion.

In an embodiment, the circumferential structure is a frame of the section of fuselage.

In an embodiment, the circumferential structure is a strap joint configured for fastening together the skin of the section of fuselage to the skin of another section of fuselage.

In an embodiment, the coupling structure comprises a stiffener.

In an embodiment, the stiffener is a reinforcing wall arranged along a direction from the edge of the dome-shaped structure to the distal portion of the coupling structure.

Structural components are normally used as stiffeners for adding rigidity and strength to adjacent load carrying structures.

In an embodiment wherein the coupling structure is in the form of a curved plate, subjected mainly to tensile or compressive stresses, reinforcement structures such as a wall provide excellent stiffening properties with respect to buckling and bending loads in all directions, as well as to resist potential torsional moments and provide a great strength to weight ratio.

In an embodiment, a reinforcing wall is implemented on the concave surface or side of the coupling structure, i.e. the side facing the pressurized area of the fuselage section, along at least a portion thereof, and projects perpendicularly to this surface.

In an embodiment, a reinforcing wall is implemented on the convex surface or side of the coupling structure, i.e. the side opposite the pressurized area of the fuselage section, along at least a portion thereof, and projects perpendicularly to this surface.

In an embodiment, the stiffener is arranged in a plane of symmetry of the coupling structure.

In an embodiment, the coupling structure comprises two reinforcing walls arranged on opposite surfaces thereof, wherein the height of one wall with respect to the surface of the coupling structure from which it projects progressively decreases along the direction from the edge of the dome-shaped structure to the distal portion of the coupling structure, and wherein the height of the other wall with respect to the surface of the coupling structure from which it projects progressively decreases along the direction from the distal portion of the coupling structure to the edge of the dome-shaped structure.

In a more particular embodiment, the two opposing reinforcing walls project perpendicularly from each respective surface of the coupling structure in a plane of symmetry thereof. In this way, both reinforcing walls provide structural continuity throughout at least a portion of the length of the coupling structure.

In an embodiment, the section of fuselage comprises a plurality of coupling structures extending from the edge of the dome-shaped structure, wherein the dome-shaped structure is secured to the circumferential structure via a distal portion of each coupling structure, wherein each distal portion is coupled to a foot portion of the circumferential structure, each coupling structure extending from the corresponding distal portion obliquely with respect to the foot portion of the circumferential structure, such that the distance between the skin of the section of fuselage and the coupling structure increases from the foot portion to the edge of the dome-shaped structure.

In an embodiment, the plurality of coupling structures is arranged over the edge of the dome-shaped structure with radial symmetry.

As aforementioned, according to vessel stress distribution, the pressure bulkhead withstands static pressure from pressurized air (i.e. radial stresses normal to the pressure bulkhead surface) and redistributes it in the form of tangential stresses which are transferred from the pressure bulkhead to the circumferential structure to which it is attached via the coupling structure.

Advantageously, load transmission from the pressure bulkhead towards the circumferential structure is improved.

In a second inventive aspect, the invention provides an aircraft comprising: a section of fuselage according to any of the embodiments of the first inventive aspect, and a second section of fuselage configured to be pressurized.

All the features described in this specification (including the claims, description and drawings) and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from embodiments of the invention, given just as examples and not being limited thereto, with reference to the drawings.

DETAILED DESCRIPTION

Figure 1:
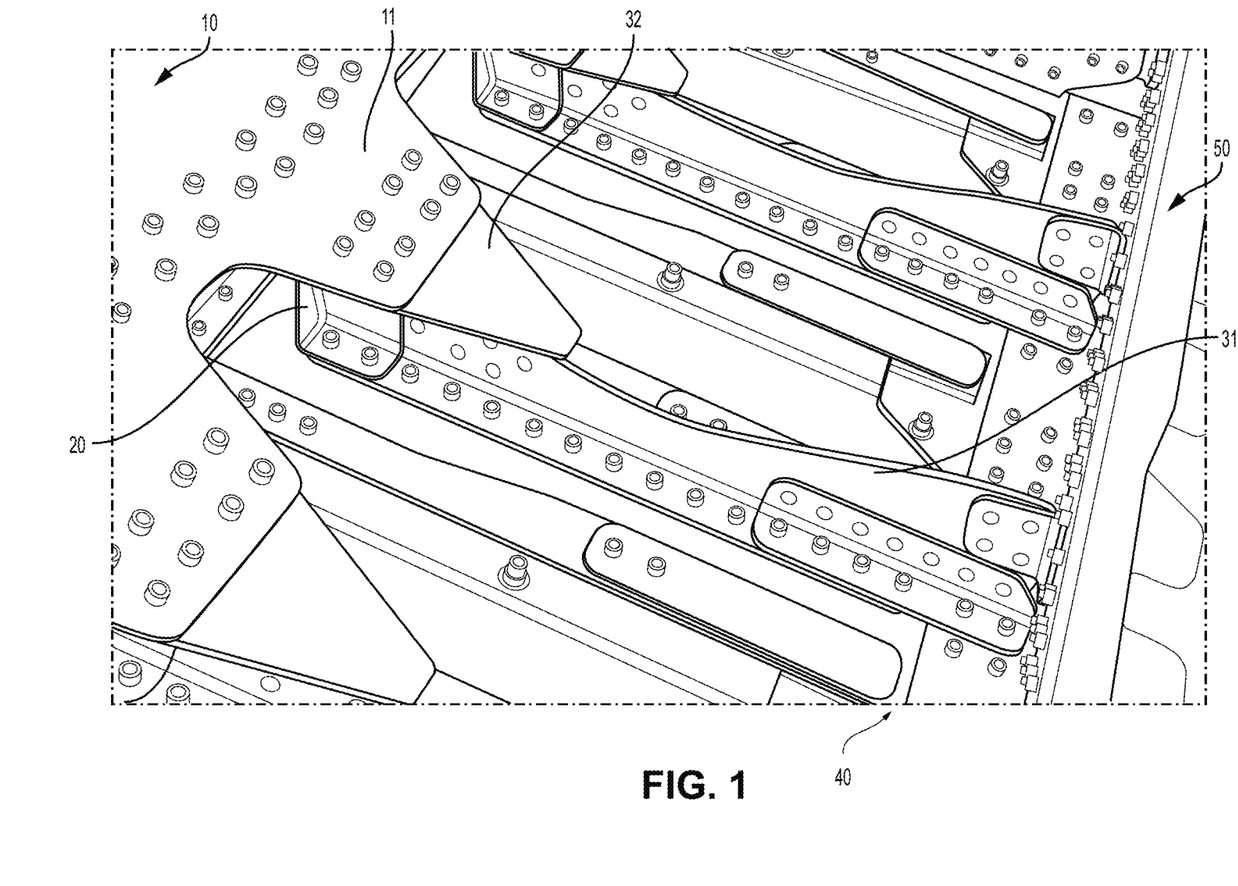
FIG. 1 shows an isometric view of a schematic representation of the integration between a circumferential structure for an aircraft and a pressure bulkhead according to the prior art.
Figure 2:
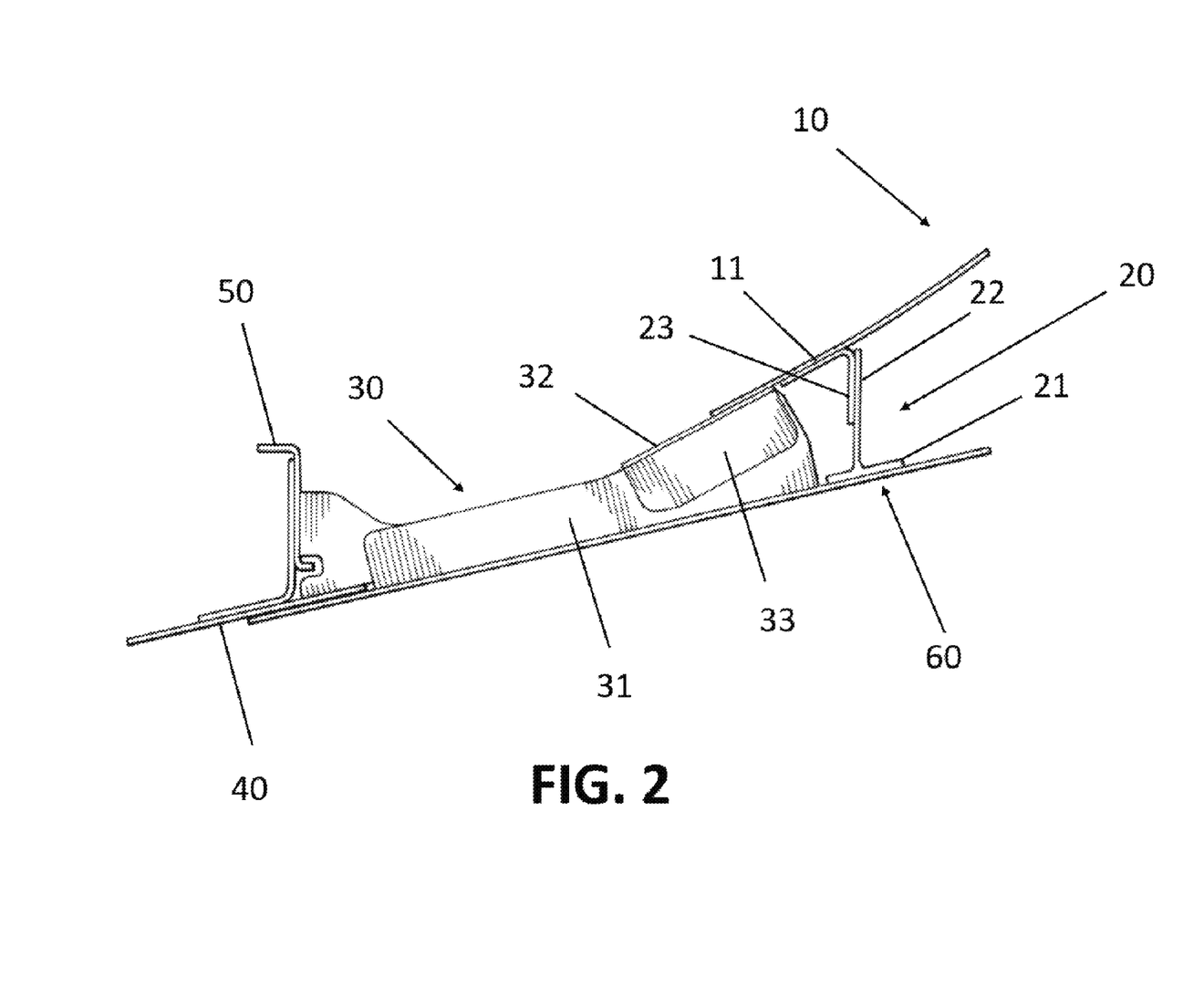
FIG. 2 shows a schematic lateral view of the architecture seen in FIG. 1.

FIGS. 1 and 2 show complementary schematic views of a representation of the integration between a section of fuselage of an aircraft and a pressure bulkhead (10) according to the prior art.

In particular, FIG. 1 shows an isometric view of said representation, while FIG. 2 shows a lateral view of the architecture shown in FIG. 1.

As it is shown, the pressure bulkhead (10) is secured to a supporting structure (20) comprising a foot portion (21) attached to the skin (60) of the fuselage, a web (22), and a circumferential angular fitting (23), shaped as a 'V-shaped' chord, attached to such web (22).

Particularly, the pressure bulkhead (10) comprises extension components (11) projecting from the edge of a dome-shaped structure of the pressure bulkhead (10), such extension components (11) being coupled along at least part of its surface onto a respective surface of the circumferential angular fittings (23).

The pressure bulkhead (10) is further secured to a circumferential structure and, more in particular, a frame (50) of the fuselage by means of a longitudinal structure (30) bridging the extension components (11) and the frame (50).

More particularly, the extension components (11) are further coupled along at least part of its surface onto a head (32) of the longitudinal structure (30), wherein said head (32) is integral with two flanges (33) projecting perpendicular thereto and defining a slot that corresponds to the thickness of a web (31) of the longitudinal structure (30).

Additionally, in FIG. 2 it is depicted a 'buttstrap' joint (40), wherein a plate overlaps and fastens the butted skin of the forward and rear sections of fuselage together.

Finally, as it can be seen, the web (31) tapers as it goes away from the extension component (11), and is coupled, such as by a riveted joint: to the skin (60) of the fuselage between the foot portion (21) of the supporting structure (20) and the buttstrap joint (40), and to the frame (50).

Figure 3:
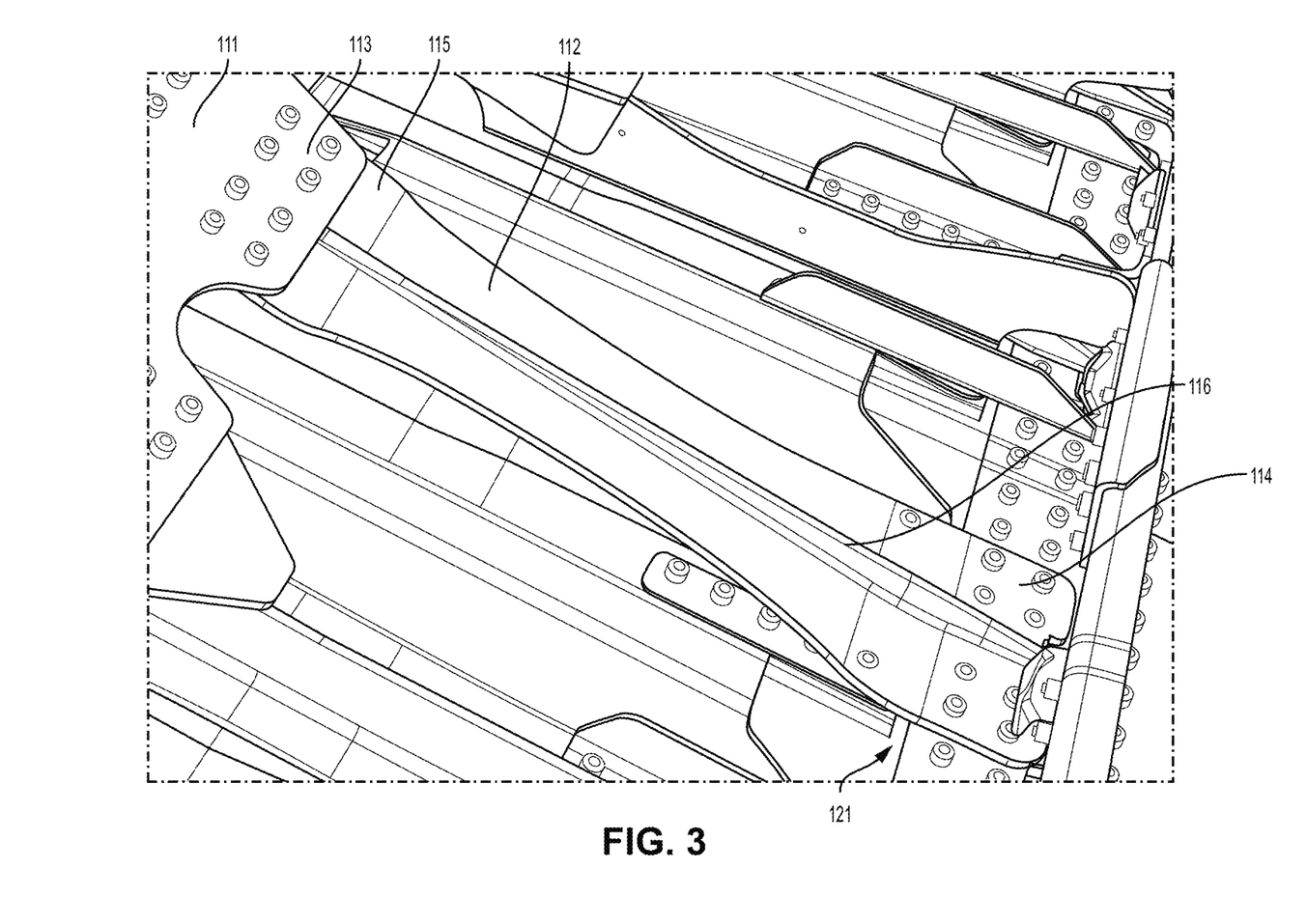
FIG. 3 shows an isometric view of a schematic representation of the integration between a circumferential structure for an aircraft and a pressure bulkhead according to an embodiment of the invention.
Figure 4:
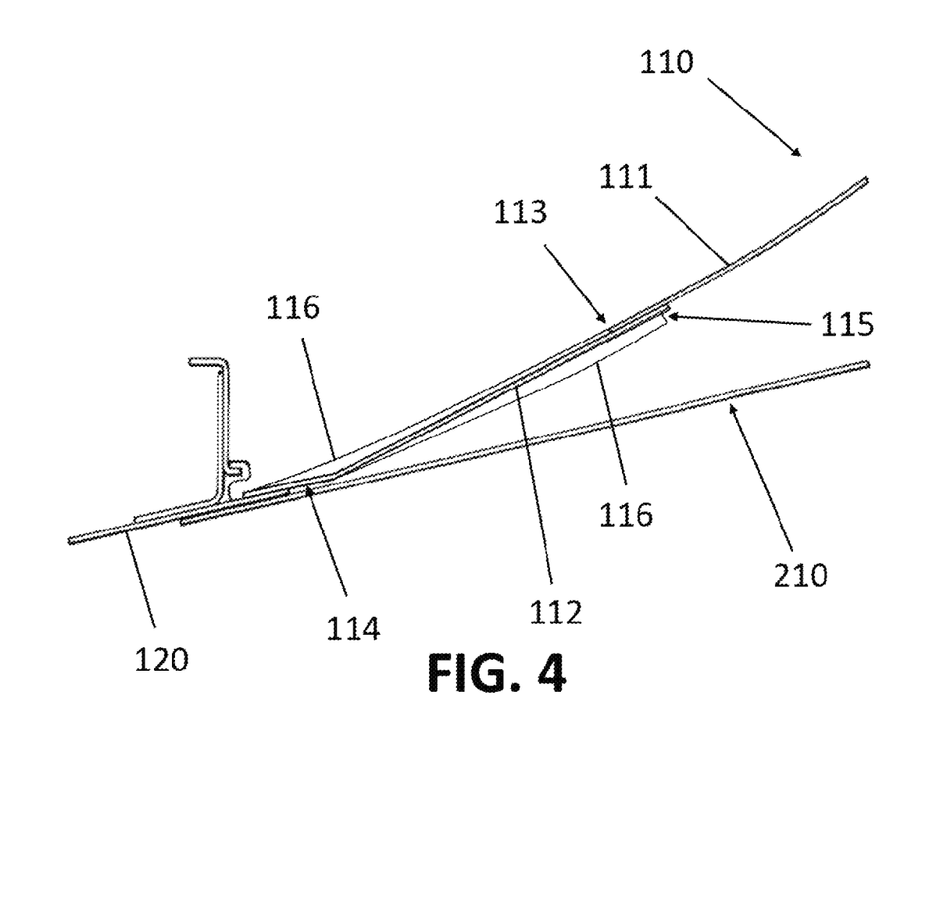
FIG. 4 shows a lateral view of the schematic architecture seen in FIG. 3.

FIGS. 3 and 4 show complementary schematic views of a schematic representation of the integration between a pressure bulkhead (100) and a circumferential structure (120) of a section of fuselage (100) for an aircraft according to an embodiment of the invention.

In particular, FIG. 3 shows an isometric view of said schematic representation, while FIG. 4 shows a schematic lateral view of the architecture shown in FIG. 3.

The design for section of fuselage (100) proposed by the present invention and, in particular, by the embodiment shown in FIGS. 3 and 4, provides a structural modification of said section of fuselage (100) compared to previous solutions of the prior art, such as the one shown in FIGS. 1 and 2, which allows to extend the cabin of an aircraft in order to gain pressurized space without enlarging the total size of the aircraft fuselage, everything while simplifying the pressure bulkhead (110) integration.

In this regard, auxiliary structural elements, such as fittings and stringers, and a large number of rivets, such those shown in FIGS. 1 and 2, to attach the pressure bulkhead (110) to a circumferential structure (120) of the aircraft are reduced, which, in addition to simplifying the structural configuration of the attachment, makes it possible to reduce the weight and resource cost of the section of fuselage (100).

In particular, the section of fuselage (100) for an aircraft (200) shown in FIGS. 1 and 2 comprises a pressure bulkhead (110) comprising a dome-shaped structure (111) and at least one coupling structure (112) extending from the edge (113) of the dome-shaped structure (111). Additionally, the section of fuselage (100) shown comprises at least one circumferential structure (120), arranged on a skin (210) of the section of fuselage (100), to which said coupling structure (112) is coupled.

In FIGS. 3 and 4, for illustrative purposes in order to provide an example of the main elements involved in the coupling between the pressure bulkhead (110) and the circumferential structure (120) in a fuselage section (100), only a portion or section of said coupling is shown. It will be understood that the section of fuselage (100) comprises a plurality of coupling structures (112) projecting from the edge (113) of the dome-shaped structure (111) of the pressure bulkhead.

Thus, throughout the description of FIGS. 3 and 4 reference may be made to coupling structures (112) in the plural, said coupling structures (112) being regarded as having a configuration and set of features identical to that of the one shown in FIGS. 3 and 4.

Furthermore, in the example of FIGS. 3 and 4, although not shown, it will be understood that the plurality of coupling structures (112) extending from the edge (113) of the dome-shaped structure (111), is arranged over the edge (113) of the dome-shaped structure (111) with radial symmetry.

As aforementioned, according to vessel stress distribution, the pressure bulkhead (110) withstands static pressure from pressurized air (i.e. radial stresses normal to the pressure bulkhead (110) surface) and redistributes it in the form of tangential stresses which are transferred from the pressure bulkhead (110) to the circumferential structure (120) to which it is attached via the coupling structures (112).

As for the attachment per se between the coupling structures (112) projecting from the edge (113) of the dome-shaped structure (111), and the circumferential structure (112) of the fuselage section (100), the dome-shaped structure (111) is secured to the circumferential structure (120) via a distal portion (114) of each of the coupling structures (112). Said distal portions (114) are coupled to respective sections of a foot portion (121) of the circumferential structure (120).

Although in different embodiments, at least some of the coupling structures (112) could be built-in extensions of the dome-shaped structure (111), in the embodiment illustrated by FIGS. 3 and 4, as can be seen, the coupling structures (112) are plate-shaped fittings coupled by a respective proximal portion (115) to the edge (113) of the dome-shaped structure (111). More in particular, as can be seen, said plate-shaped fittings (112) are fastened to the edge (113) of the dome-shaped structure (111) by means of a riveted joint. In this regard, said plate-shaped fittings (112) are also fastened to the foot portion (121) of the circumferential structure (120) by means of a riveted joint.

Examples of circumferential structures (120) of a section of fuselage (100) for an aircraft may be frames or strap joints configured for fastening together the skin of two consecutive sections of fuselage.

In the particular embodiment shown in FIGS. 3 and 4, the plate-shaped fittings are coupled to a strap joint (120) which, in turn, comprises a plate-shaped foot portion (121), and, as can be seen, the distal portion (114) of the coupling structure (112) comprises a substantially flat portion contacting along its surface a respective surface of said plate-shaped foot portion (121).

Additionally, as can be seen, the coupling structures (112) (i.e., the plate-shaped fittings) extend obliquely from the foot portion (121) of the strap joint (120), such that the distance between the skin (210) of the section of fuselage (100) to which the strap joint (120) is attached, and the coupling structure (112) increases from said distal portion (114) to the edge (113) of the dome-shaped structure (111).

Finally, the plate-shaped fittings (112) of the embodiment shown in FIGS. 3 and 4 comprise a reinforcing wall(s) (116), such as stiffener(s). More in particular, the plate-shaped fittings (112) comprise two reinforcing walls (116) arranged on opposite surfaces of the plate-shaped fittings (112), between the edge of the dome-shaped structure (111) and the distal portion (113) of the plate-shaped fitting (112), in a plane of symmetry thereof.

As it can be seen, the height of the reinforcing wall (116) arranged on the convex surface of the coupling structure (112), with respect to the surface from which it projects, progressively decreases along the direction from the edge of the dome-shaped structure (111) to the distal portion (114) of the coupling structure (112).

On the other hand, the height of the reinforcing wall (116) arranged on the concave surface of the coupling structure (112), with respect to the surface from which it projects, progressively decreases along the direction from the distal portion (114) of the coupling structure (112) to the edge of the dome-shaped structure (111).

Structural components are normally used as stiffeners for adding rigidity and strength to adjacent load carrying structures.

For geometries such as that of the coupling structure (112), in the form of a slightly curved plate, subjected mainly to tensile or compressive stresses, the stiffeners (116) shown, in the shape of reinforcing walls (116), provide excellent stiffening properties with respect to buckling and bending loads in all directions, as well as to resist potential torsional moments and provide a great strength to weight ratio.

Figure 5:
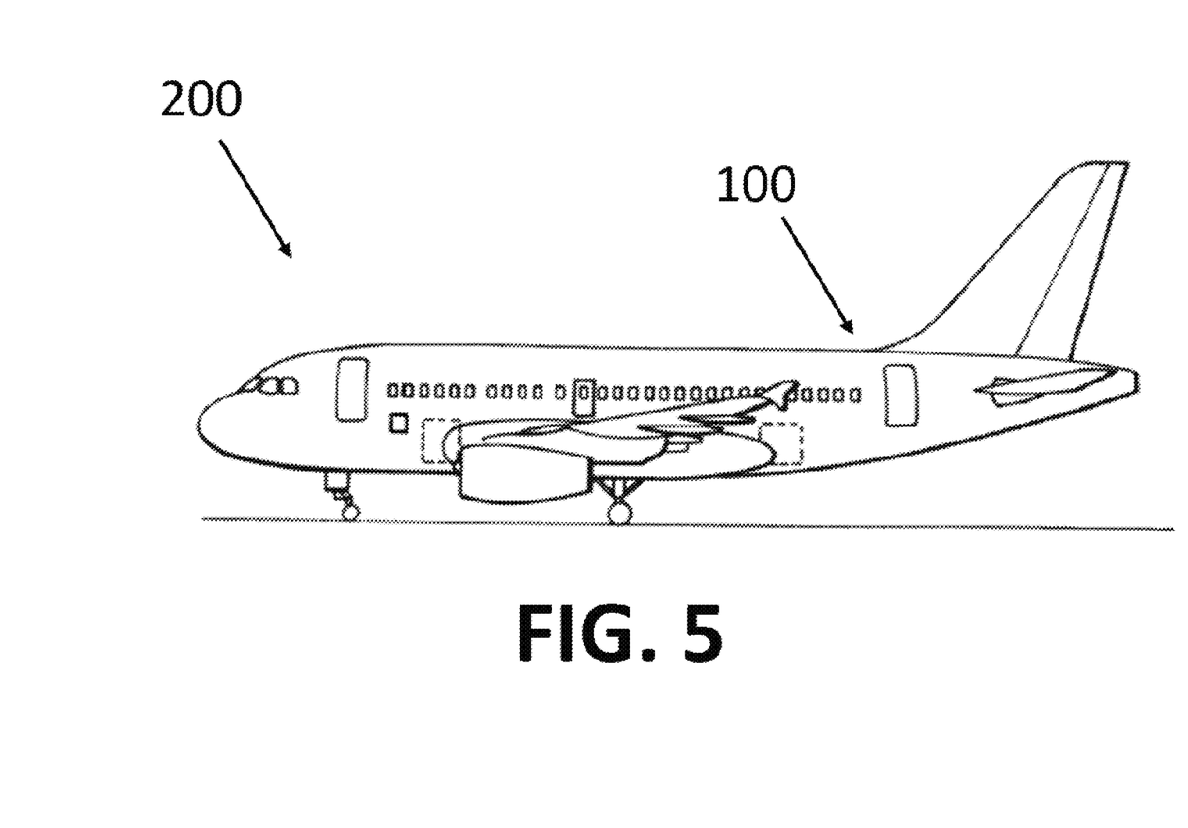
FIG. 5 shows an embodiment of the invention for an aircraft comprising a section of fuselage according to an embodiment of the invention.

FIG. 5 shows an embodiment of an aircraft (200) comprising a section of fuselage (100) according to an embodiment of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless this application states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A section of an aircraft fuselage comprising:
    a skin of the aircraft fuselage;
    a pressure bulkhead including a dome shaped structure and at least one coupling structure extending from an edge of the dome-shaped structure, and
    a circumferential structure arranged on the skin,
    wherein the dome-shaped structure is secured to the circumferential structure via a distal portion of the coupling structure,
    wherein said distal portion is coupled to a foot portion of the circumferential structure,
    wherein the coupling structure extends obliquely from the foot portion of the circumferential structure,
    wherein a distance between the skin of the section of the aircraft fuselage and the coupling structure increases from the foot portion to the edge of the dome-shaped structure,
    wherein the coupling structure comprises two reinforcing walls arranged on opposite surfaces of the coupling structure,
    wherein a height of a first of the two reinforcing walls with respect to the surface of the coupling structure progressively decreases along a direction from the edge of the dome-shaped structure to the distal portion of the coupling structure, and
    wherein a height of a second of the two reinforcing walls with respect to the surface of the coupling structure progressively decreases along the direction from the distal portion of the coupling structure to the edge of the dome-shaped structure.

2. The section of aircraft fuselage according to claim 1, wherein the coupling structure is a built-in extension of the dome-shaped structure.

3. The section of aircraft fuselage according claim 1, wherein the coupling structure is a plate-shaped fitting coupled by a proximal portion to the edge of the dome-shaped structure.

4. The section of the aircraft fuselage according to claim 3, wherein the plate-shaped fitting is fastened to the edge of the dome-shaped structure by a riveted joint.

5. The section of the aircraft fuselage according to claim 1, wherein the coupling structure is coupled to the circumferential structure by a riveted joint.

6. The section of the aircraft fuselage according to claim 1, wherein the foot portion of the circumferential structure is plate-shaped, and
    wherein the distal portion of the coupling structure comprises a substantially flat portion having a surface contacting a respective surface of the plate-shaped foot portion.

7. The section of the aircraft fuselage according to claim 1, wherein the circumferential structure is a frame of the section of fuselage.

8. The section of the aircraft fuselage according to claim 1, wherein the circumferential structure is a strap joint configured to fasten together the skin of the section of the aircraft fuselage to a skin of another section of the aircraft fuselage.

9. The section of the aircraft fuselage according to claim 1, wherein the two reinforcing walls are arranged in a plane of symmetry of the coupling structure.

10. The section of the aircraft fuselage according to claim 1, further comprising:
    the at least one coupling structure includes a plurality of coupling structures extending from the edge of the dome-shaped structure, wherein the plurality of coupling structures are secured to the circumferential structure via the distal portion of each of the coupling structures,
    wherein the distal portion for each of the coupling structures coupled to the foot portion of the circumferential structure, each coupling structure extends from a corresponding of the distal portions obliquely with respect to the foot portion of the circumferential structure, such that a distance between the skin of the section of fuselage and the coupling structure increases from the distal portion to the edge of the dome-shaped structure.

11. The section of the aircraft fuselage according to claim 10, wherein the plurality of coupling structures is arranged over the edge of the dome-shaped structure with radial symmetry.

12. An aircraft comprising:
    the section of the aircraft fuselage according to claim 1, and
    a second section of the aircraft fuselage configured to be pressurized.

13. An aircraft fuselage comprising:
    a skin extending circumferentially and longitudinally around an interior of the fuselage;
    a pressure bulkhead including a dome shaped structure and a coupling structure extending from an outer circumferential edge of the dome-shaped structure;
    a circumferential structure fixed onto the skin and including a foot attached to a distal portion of the coupling structure to secure the pressure bulkhead in the fuselage;
    wherein the coupling structure extends obliquely from the foot portion of the circumferential structure,
    wherein a distance between the skin and the coupling structure increases along a direction extending from the foot portion to the edge of the dome-shaped structure,
    wherein the coupling structure comprises reinforcing walls arranged on opposite sides of the coupling structure, wherein a height of a first of the reinforcing walls with respect to the coupling structure progressively decreases along a direction from the edge of the dome-shaped structure to the distal portion of the coupling structure, and wherein a height of a second of the reinforcing walls with respect to the coupling structure progressively decreases along the direction from the distal portion of the coupling structure to the edge of the dome-shaped structure.

14. The aircraft fuselage of claim 13, wherein the coupling structure is a plate shaped fitting having a proximal portion fixed to the edge of the dome-shaped structure.

15. The aircraft fuselage of claim 13, wherein the foot of the circumferential structure is plate shaped, and wherein the distal portion of the coupling structure comprises a substantially flat portion having a surface contacting a respective surface of the foot.

16. The aircraft fuselage of claim 13, wherein the circumferential structure is a frame of the section of fuselage.

* * * * *